US012294299B2

(12) United States Patent
Sagona et al.

(10) Patent No.: US 12,294,299 B2
(45) Date of Patent: May 6, 2025

(54) SOFT START FOR BUCK CONVERTERS (71) Applicant: Hamilton Sundstrand Corporation, Charlotte, NC (US)

(72) Inventors: John Duward Sagona, Poplar Grove, IL (US); Patrick B. Palanca, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 344 days.

(21) Appl. No.: 17/717,776

(22) Filed: Apr. 11, 2022

(65) Prior Publication Data
US 2023/0327550 A1    Oct. 12, 2023

(51) Int. Cl.
*H02M 3/158*    (2006.01)
*H02M 1/36*    (2007.01)
*H02M 3/157*    (2006.01)

(52) U.S. Cl.
CPC .............. *H02M 3/158* (2013.01); *H02M 1/36* (2013.01); *H02M 3/157* (2013.01)

(58) Field of Classification Search
CPC ........................................................ H02M 1/36
See application file for complete search history.

(56) References Cited

U.S. PATENT DOCUMENTS

| | | | |
|---|---|---|---|
| 6,933,710 B2 | 8/2005 | Shieh | |
| 7,038,514 B2 * | 5/2006 | Leith | H02M 1/36 |
| | | | 327/540 |
| 8,120,342 B1 | 2/2012 | Kahn et al. | |
| 8,242,764 B2 | 8/2012 | Shimizu et al. | |
| 8,416,591 B2 | 4/2013 | Uehara | |
| 9,438,109 B2 * | 9/2016 | Moon | G05F 1/468 |
| 9,882,481 B2 | 1/2018 | Mascioli et al. | |
| 10,044,271 B1 * | 8/2018 | Assaad | H03K 4/06 |
| 10,461,647 B2 | 10/2019 | Baurle et al. | |
| 10,491,117 B2 | 11/2019 | Moon et al. | |
| 10,622,897 B2 | 4/2020 | Sagona | |
| 12,068,692 B2 * | 8/2024 | Perry | H02M 3/33592 |
| 2003/0035260 A1 * | 2/2003 | Shearon | H02M 3/158 |
| | | | 361/93.7 |
| 2004/0174144 A1 | 9/2004 | Huang et al. | |
| 2005/0194951 A1 * | 9/2005 | Mehas | H02M 3/156 |
| | | | 323/282 |
| 2009/0302816 A1 | 12/2009 | Kunimatsu | |

(Continued)

FOREIGN PATENT DOCUMENTS

CN    113489318 A    10/2021

OTHER PUBLICATIONS

Extended European Search Report dated Sep. 7, 2023, issued during the prosecution of European Patent Application No. EP 23167425.0.

*Primary Examiner* — Gustavo A Rosario-Benitez (57) ABSTRACT

A method of DC-DC power conversion includes converting a DC link voltage to a DC output voltage for a load that is lower than the DC link voltage using a buck converter. The method includes controlling the buck converter in a normal switching mode in response to the DC link voltage being below a predetermined high threshold. The method also includes controlling the buck converter in a soft start switching mode in response to the DC link voltage being at or above the predetermined high threshold.

20 Claims, 4 Drawing Sheets (56) References Cited

U.S. PATENT DOCUMENTS

| | | | |
|---|---|---|---|
| 2011/0075450 A1* | 3/2011 | Shimada | H02M 3/33523 |
| | | | 363/21.18 |
| 2014/0292292 A1 | 10/2014 | Koski | |
| 2016/0380537 A1* | 12/2016 | Bizjak | H02M 1/36 |
| | | | 323/271 |
| 2017/0054376 A1* | 2/2017 | Quigley | H02M 3/33507 |
| 2017/0070149 A1 | 3/2017 | Guan et al. | |
| 2018/0006560 A1 | 1/2018 | Mascioli et al. | |
| 2019/0123636 A1* | 4/2019 | Moallem | G05F 1/563 |
| 2019/0229613 A1* | 7/2019 | Wiedenbauer | H02M 1/36 |
| 2022/0060109 A1* | 2/2022 | Wollschlager | H02M 3/156 |
| 2022/0103069 A1 | 3/2022 | Chiang | |

* cited by examiner

SOFT START FOR BUCK CONVERTERS

BACKGROUND

1. Field

The present disclosure relates to power conversion, and more particularly to buck converters for stepping an input voltage down to a lower output voltage.

2. Description of Related Art

Buck converters can step down an input or link voltage to a lower output voltage. Buck synchronous and standard power converters with a wide input range, e.g. 90 VDC to 600 VDC, which is a much wider input range than in traditional applications, can cause problems on loads on the output voltage because at start up there is not a smooth, robust output voltage.

The conventional techniques have been considered satisfactory for their intended purpose. However, there is an ever present need for improved systems and methods for robust, smooth output voltage at start up for buck converters. This disclosure provides a solution for this need.

SUMMARY

A method of DC-DC power conversion includes converting a DC link voltage to a DC output voltage for a load that is lower than the DC link voltage using a buck converter. The method includes controlling the buck converter in a normal switching mode in response to the DC link voltage being below a predetermined high threshold. The method also includes controlling the buck converter in a soft start switching mode in response to the DC link voltage being at or above the predetermined high threshold.

Controlling the buck converter in the soft start switching mode can include latching the soft start switching mode in an enabled state upon occurrence of enablement of voltage regulation in the buck converter, the DC link voltage being at or above the predetermined high threshold, to keep the rate limited switching mode enabled even if the DC link voltage drops below the predetermined high threshold after latching, and the DC output voltage being at or below a predetermined initial soft start voltage limit.

Controlling the buck boost converter in the soft start switching mode can include latching the soft start switching mode in an enabled state upon occurrence of the DC output voltage being at or above a predetermined final soft start voltage, and load current being at or above a predetermined soft start current limit. The method can include resetting the enabled state of the soft start switching mode upon disabling of voltage regulation in the buck converter.

Controlling the buck converter in the normal switching mode can include controlling current to the load based on measured current supplied to the buck converter at the DC Link Voltage, and a commanded inductor current for controlling current in a main inductor of the buck converter. The commanded inductor current for controlling the current in the main inductor can be derived from a voltage regulation control signal that is based on a differential of commanded output voltage and measured output voltage to the load.

Controlling the buck converter in the soft start switching mode can include controlling current to the load based on measured current supplied to the load, measured current supplied to the buck converter at the DC Link Voltage, and a commanded peak inductor ramp command for controlling current in a main inductor of the buck converter. The soft start switching mode can include reducing switching frequency in one switch of the buck converter and disabling a second switch of the buck converter.

A DC-DC conversion system includes a buck converter configured to receive a DC link voltage as input and to output a DC output voltage that is lower than the DC link voltage. A controller is operatively connected to the buck converter to control the buck converter. The controller includes logic configured to control the buck converter in a normal switching mode in response to the DC link voltage being below a predetermined high threshold, and control the buck converter in a soft start switching mode in response to the DC link voltage being at or above the predetermined high threshold.

The buck converter can include a positive DC link voltage node and a negative DC link voltage node. A switching component can connect the positive and negative DC link voltage nodes. The controller can be operatively connected to control switching of the switching component. The switching component can includes a pair of switches connected in series. The buck converter can include a main inductor connecting a node between the two switches to a positive DC output node. A first reluctance can be included in the form of the inductor winding resistance of the main inductor. A second reluctance can be connected in series between the positive DC output node and the negative DC link voltage node. The negative DC link voltage node can be configured to serve as a negative DC output node. An input capacitor can connect between the positive and negative DC link voltage nodes in parallel with the switching component.

A first current sensor can be operatively connected to provide input indicative of current through the positive DC output node to a soft start function logic component of the controller. A second current sensor can be operatively connected to provide input indicative of current through the positive DC link voltage node to a current control logic component of the controller. The current control logic component can be operatively connected to control switching of the switching component.

A first voltage sensor can be operatively connected to provide input indicative of voltage across the positive DC output node and the negative DC link voltage node to the controller. A second voltage sensor can be operatively connected to provide input indicative of voltage across the positive and negative DC link voltage nodes to the controller.

A differential logic component can be operatively connected to output a differential signal indicative of difference between the input from the first voltage sensor and a commanded output voltage to a voltage regulation logic component configured to output a voltage control signal based on the differential signal. A switch logic component can be operatively connected to receive input from the soft start function logic component and from the voltage control logic component. The switch logic component can be configured to switch between sending output from the soft start function logic component or from the voltage regulation logic component to the current control logic component. The soft start function logic component can be operatively connected to receive input from the second voltage sensor, and to control the switch logic component between the soft start switching mode and the normal switching mode. The soft start function logic can include a rate limiter operatively connected to output a rate limiting signal to the current control logic.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

TABLE 1 shows the logic states for the set/reset logic components of FIG. 2.

DETAILED DESCRIPTION OF THE PREFERRED EMBODIMENTS

Figure 1:
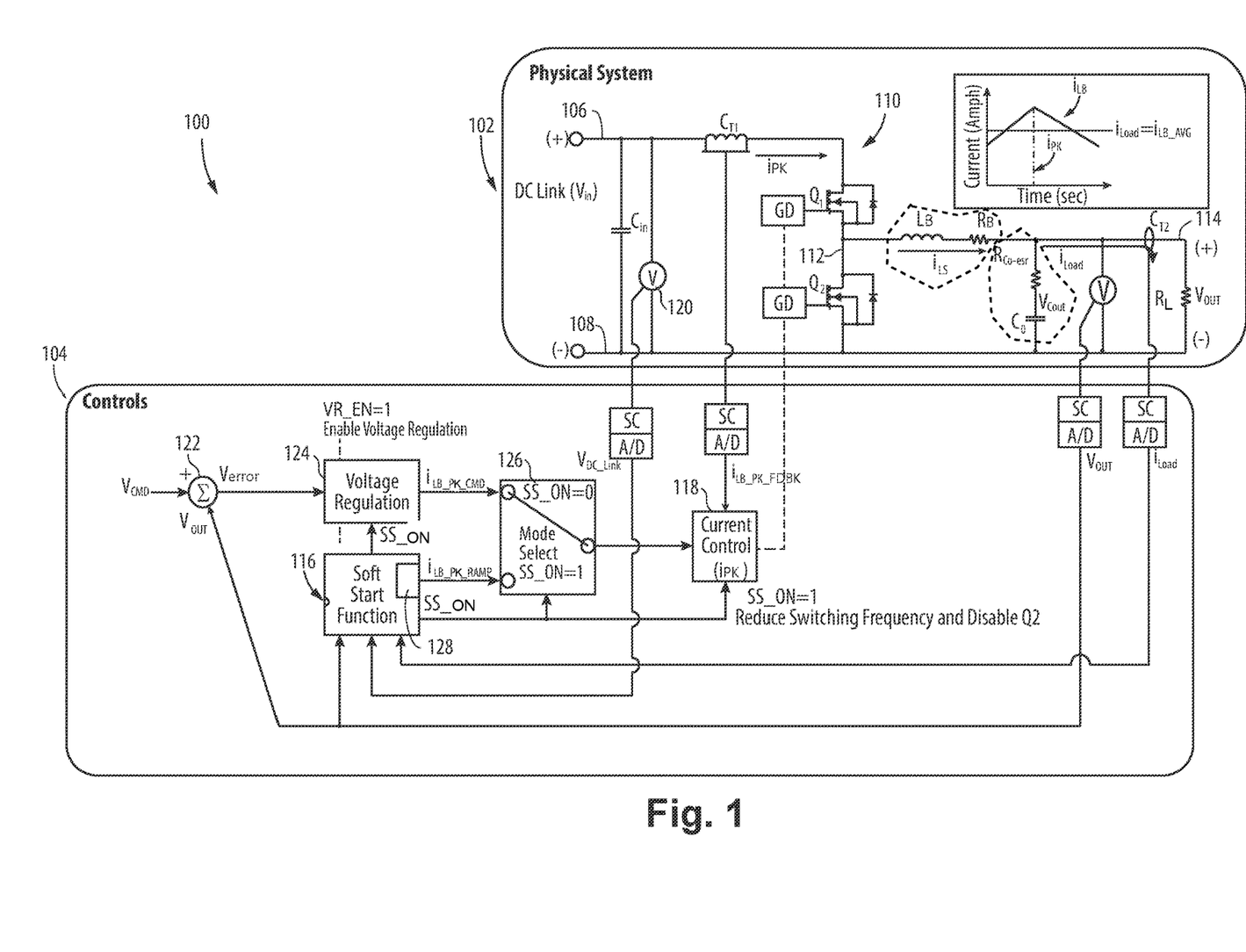
FIG. 1 is a schematic view of an embodiment of a system constructed in accordance with the present disclosure, showing the buck converter and the controller.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4 and TABLE 1, as will be described. The systems and methods described herein can be used to provide a soft start mode for synchronous/standard buck power converters with wide input voltage ranges, e.g. where the input voltage ranges from 90 VDC to 600 VDC.

The DC-DC conversion system 100 includes a buck converter 102 configured to receive a DC link voltage as input and to output a DC output voltage that is lower than the DC link voltage. A controller 104 is operatively connected to the buck converter 102 to control the buck converter 102. The controller 104 includes logic configured to control the buck converter 102 in a normal switching mode in response to the DC link voltage being below a predetermined high threshold. The controller 104 also includes logic configured to control the buck converter 102 in a rate limited switching mode in response to the DC link voltage being at or above the predetermined high threshold.

The buck converter 102 includes a positive DC link voltage node 106 and a negative DC link voltage node 108. A switching component 110 connects the positive and negative DC link voltage nodes 106, 108. The controller 104 is operatively connected to control switching of the switching component 110. The switching component 110 includes a pair of switches $Q_1$ and $Q_2$ connected in series across the positive and negative DC link voltage nodes 106, 108. The switching components $Q_1$ and $Q_2$ can be any suitable type of switches, such as solid state switches where the gates are connected to the controller 104 so the controller 104 can control the switching of the switching components to produce the output voltage at the DC output nodes 114, 108.

The buck converter 102 includes a main inductor $L_B$ connecting a node 112 between the two switches $Q_1$ and $Q_2$ to a positive DC output node 114. A first reluctance indicated with a dashed box in FIG. 1 includes the main inductor LB, wherein RB is the coil resistance of the main inductor LB. A second reluctance (the capacitor CO and its associated internal resistance, RCoesr as indicated by a dashed line box around them in FIG. 1) is connected across the positive DC output node 114 and the negative DC link voltage node 108, which is configured to serve as a negative DC output node. The second reluctance is connected in parallel with the load (represented in FIG. 1 by $R_L$). Those skilled in the art will readily appreciate that the load is not necessarily part of the buck converter 102, and can be any suitable load to be powered by the output voltage and current of the cuck converter 102. An input capacitor $C_{in}$ connects between the positive and negative DC link voltage nodes 106, 108 in parallel with the switching component 110.

While shown and described with a buck converter 100 (in FIG. 1) that is a synchronous buck converter, those skilled in the art will readily appreciate that the second switch $Q_2$ can be changed to a diode, pointed upward as oriented in FIG. 1, to make a standard buck converter which can operate using similar methods as disclosed herein without departing from the scope of this disclosure.

A first current sensor $C_{T2}$ is operatively connected to provide input indicative of current through the positive DC output node 114 to a soft start function logic component 116 of the controller. A second current sensor $C_{T1}$ is operatively connected to provide input indicative of current through the positive DC link voltage node to a current control logic component 118 of the controller 104. The current control logic component 118 is operatively connected to control switching of the switching component 110.

A first voltage sensor $V_O$ is operatively connected to provide input indicative of voltage across the positive DC output node 114 and the negative DC link voltage node 108 to the controller 104. A second voltage sensor 120 is operatively connected to provide input indicative of voltage across the positive and negative DC link voltage nodes 106, 108 to the controller 104.

A differential logic component 122 is operatively connected to output a differential signal ($V_{ERROR}$ in FIG. 1) indicative of difference between the input from the first voltage sensor $V_O$ and a commanded output voltage $V_{CMD}$ to a voltage regulation logic component 124 configured to output a voltage control signal ($i_{LB\_PK\_CMD}$ in FIG. 1) based on the differential signal $V_{ERROR}$. The control algorithm inside block 124 can be a standard control algorithm, i.e. a proportional plus integral, although any other suitable type of control algorithm can be used. A switch logic component 126 is operatively connected to receive input from the soft start function logic component 116 ($i_{LB\_PK\_RAMP}$ in FIG. 1) and from the voltage control logic component 124 ($i_{LB\_PK\_CMD}$). The switch logic component is configured to switch between sending output from the soft start function logic component 116 or from the voltage regulation logic component 124 to the current control logic component 118. The soft start function logic component 116 is operatively connected to receive input from the second voltage sensor 120, and to control the switch logic component 126 between the soft start switching mode and the normal switching mode. The soft start function logic 116 includes a rate limiter 128 operatively connected to output a rate limiting signal ($i_{LB\_PK\_RAMP}$) to the current control logic 118.

With continued reference to FIG. 1, a method of DC-DC power conversion includes converting a DC link voltage to a DC output voltage for a load that is lower than the DC link voltage using a buck converter, e.g. buck converter 102. The method includes controlling the buck converter in a normal switching mode in response to the DC link voltage, e.g. at the voltage sensor 120) being below a predetermined high threshold. The method also includes controlling the buck converter in a soft start switching mode in response to the DC link voltage being at or above the predetermined high threshold.

Figure 2:
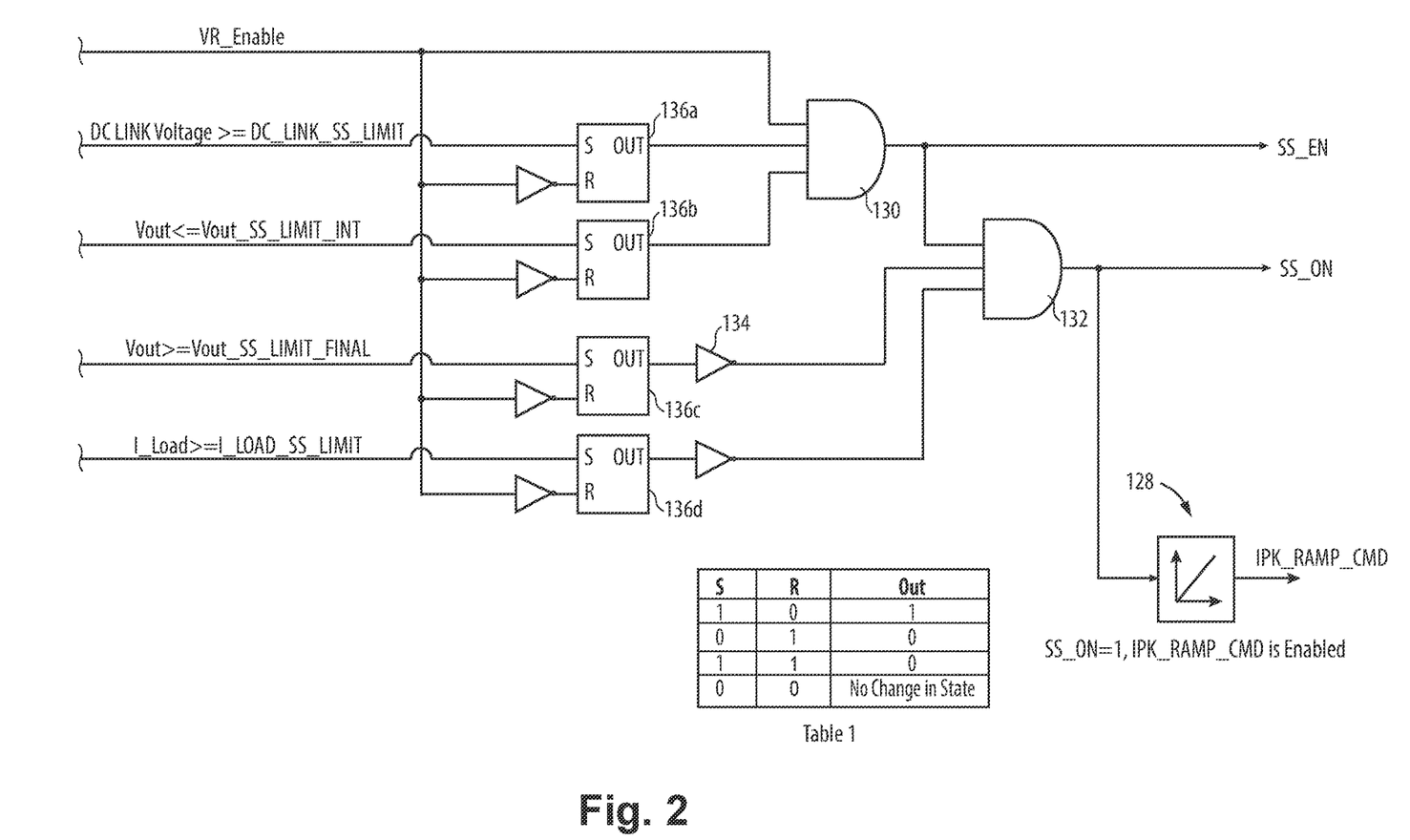
FIG. 2 is a schematic view of the logic in the controller of FIG. 1 for enabling and disabling the soft start mode based on the logic states shown in TABLE 1.

With reference now to FIG. 2, controlling the buck converter in the soft start switching mode includes latching the soft start switching mode in an enabled state (SS_ON=1 in FIGS. 1 and 2) upon occurrence of enablement (VR_Enable=1 in FIGS. 1 and 2) of voltage regulation in the buck converter, the DC link voltage (at voltage sensor 120 in FIG. 1) being at or above the predetermined high threshold (DC LINK VOLTAGE>=DC_LINK_SS_LIMIT=1 in FIG. 2), to keep the rate limited switching mode enabled even if the DC link voltage drops below the predetermined high threshold after latching. The third enablement requirement for enablement of the soft start switching mode is the DC output voltage (at $V_{OUT}$ in FIG. 1) being at or below a predetermined initial soft start voltage limit ($V_{OUT}<=V_{OUT}\_SS\_LIMIT\_INT$ in FIG. 2). The three aforementioned conditions are inputs for a first AND gate 130. If the inputs to the first AND gate 130 are all 1, then the SS_EN condition of FIG. 1 is set to 1. The output of the first AND gate 130 is an input to the second AND gate 132.

With continued reference now to FIG. 2, there are two additional inputs to the second AND gate 132. First is latching the soft start switching mode in an enabled state upon occurrence of the DC output voltage not being at or above a predetermined final soft start voltage ($V_{OUT}>=V_{OUT}\_SS\_LIMIT\_FINAL$), note the logic inverter 134 inverts the $V_{OUT}>=V_{OUT}\_SS\_LIMIT\_FINAL$ condition between the set/reset logic 136c and the second AND gate 132. The second additional input is occurrence of the load current not being at or above a predetermined soft start current limit (i_Load>=I_LOAD_SS_LIMIT), note the logic inverter 138 inverts the i_Load>=I_LOAD_SS_LIMIT condition between the set/reset logic 136d and the second AND gate 132. If all of the inputs to the second AND gate 132 are 1, then the output of the second AND gate 132, namely SS_ON in FIGS. 1 and 2, is 1 enabling the soft start mode, enabling the rate limiter 128 as input for the current control logic component 118.

The method can include resetting the enabled state of the soft start switching mode upon disabling of voltage regulation in the buck converter. In FIG. 2, the set/reset logic boxes 136a-d are reset when the VR_Enable is set to 0. TABLE 1 provides the logic for the S and R inputs for the set/reset logic boxes 136a-d, and the corresponding outputs.

With continued reference to FIG. 2, SS_ON is an input to the voltage regulation logic component 124 of FIG. 1. When SS_ON is set to 1 as output from the first AND gate 130, the voltage regulation logic component is held in reset (Verror=0, PI controller or any other type of integration states are held to zero). SS_ON is an input to the switch logic component 126 of FIG. 1 and to the current control logic component 118. When SS_ON=1, The IPK_RAMP_CMD is selected (in the switch logic component 126) and the pulse width modulation (PWM) frequency is reduced for the first switch $Q_1$ and the slower switch $Q_2$ is disabled by the current control logic component 118).

With reference again to FIG. 1, controlling the buck converter in the normal switching mode includes controlling current to the load based on measured current supplied to the buck converter at the DC Link Voltage, e.g. as measured by $C_{T1}$, and a commanded inductor current, e.g. $i_{LB\_PK\_CMD}$ in FIG. 1, for controlling current in a main inductor, e.g. $L_B$, of the buck converter. The commanded inductor current, $i_{LB\_PK\_CMD}$, for controlling the current in the main inductor is derived from a voltage regulation control signal that is based on a differential of commanded output voltage and measured output voltage to the load, e.g. the voltage regulation logic component 124 outputs the $i_{LB\_PK\_CMD}$ based on input received from the differential logic component 122.

Controlling the buck converter in the soft start switching mode includes controlling current to the load based on measured current supplied to the load, e.g. as measured by the current sensor $C_{T2}$, also based on measured current supplied to the buck converter at the DC Link Voltage, e.g. as measured by current sensor $C_{T1}$, and a commanded peak inductor ramp command, e.g. $i_{LB\_PK\_RAMP}$, for controlling current in a main inductor of the buck converter. The soft start switching mode includes reducing switching frequency in one switch, e.g. switch $Q_1$, of the buck converter and disabling a second switch, e.g. switch $Q_2$, of the buck converter.

Figure 3:
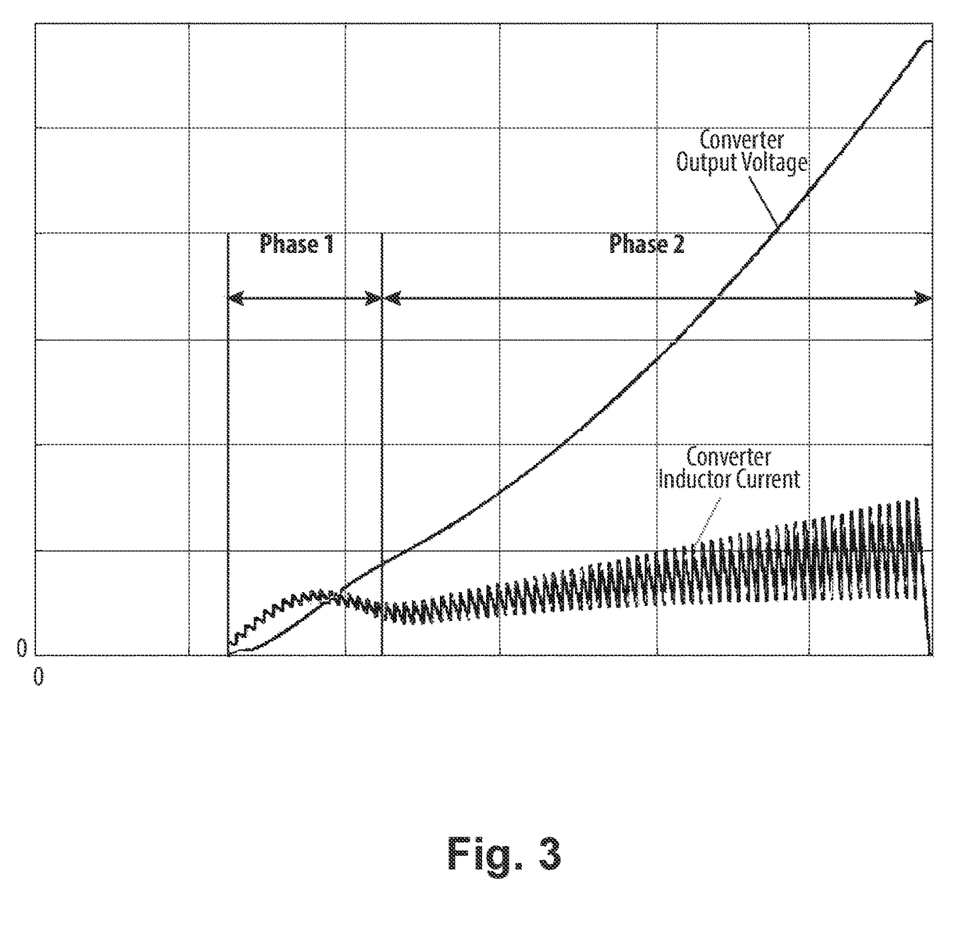
FIG. 3 is a normalized graph of voltage and current versus time for converter output voltage and converter inductor current.

With reference now to FIG. 3, the two phases of the soft start mode are shown graphically where output voltage and inductor current are plotted versus time. In a first phase (Phase 1) the voltage regulation logic component 124 of FIG. 1 is set in reset (hold all states to zero as described above). This limits inrush current by reducing switching frequency and starts inductor peak current ramp, e.g. using the rate limiter 128 of FIGS. 1 and 2. In the second phase (Phase 2) the soft start logic component 116 of FIG. 1 continues to ramp the inductor peak current command ($i_{LB\_PK\_RAMP}$ in FIG. 1) until output voltage (sensed by $V_{OUT}$) or load current thresholds (i_Load>=i_LOAD_SS_LIMIT in FIG. 2, where i_LOAD is measured by the current sensor $C_{T2}$) are valid.

Figure 4:
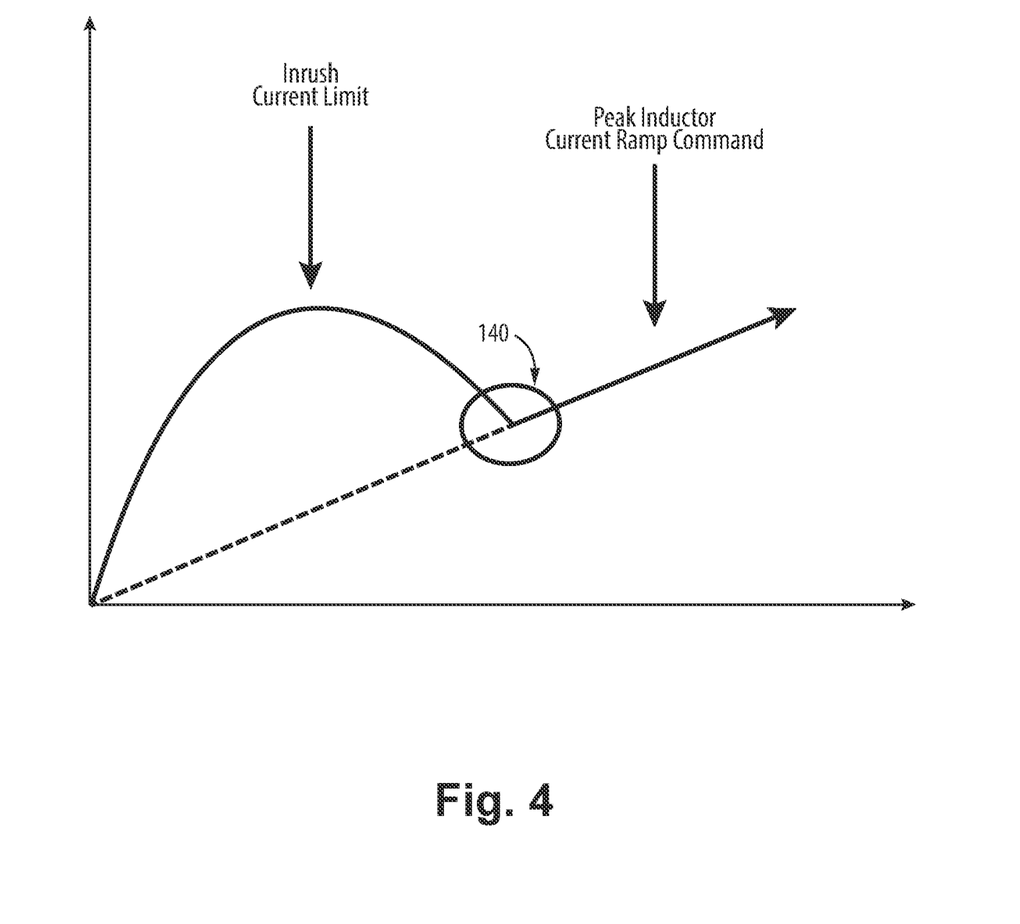
FIG. 4 is normalized graph of the soft start function, showing the inrush current limit and the peak inductor current ramp command as a function of time.

Reference is now made to FIG. 4, where current us plotted versus time. The main inductor LB (shown in FIG. 1) is operated in peak inductor current mode. During the start of the soft start function the buck converter output is initially set to zero and therefore the inductor volts-sec product is unable to keep balanced over a switching cycle. The Inductor volt-sec $V_L$ is defined as:

$$V_L = (V_{in} - V_{out})*T_{on} + -V_{out}*T_{off}$$

where $V_{in}$ is the DC link voltage, $V_{out}$ is the DC output voltage, $T_{on}$ is the minimum on time of the upper switch $Q_1$ in FIG. 1, and Toff is the off time for the upper switch $Q_1$. The change in inductor current di is defined by:

$$di = (V_L*dt)/L$$

where L is inductance of the main inductor. To obtain a balanced buck inductor volt-sec the following must be true:

$$Vin <= (Vout)/(Ton*Fsw)$$

where Fsw is switching frequency. The only parameter that can be changed is the switching frequency. Vin is defined by the application (for example using a maximum Vin=600V), Ton is defined by the minimum on time of the upper switch $Q_1$ in FIG. 1, and Vout is close to zero during initial turn-on. To limit the initial in-rush inductor current the switching frequency is reduced by ⅓, which is application dependent.

This circle 140 in FIG. 4 indicates where the inrush current and peak inductor current rate command intersect to provide a smooth output voltage ramp.

Systems and method disclosed herein provide potential benefits including the following. It is possible to avoid a large overvoltage on the load that is otherwise possible if the buck converter is not soft started. The large overvoltage would otherwise also loads input capacitor ($C_{in}$ in FIG. 1), so with systems and methods as disclosed herein a smaller input capacitor can be used than in systems without a soft start mode.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module," "component" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

The methods and systems of the present disclosure, as described above and shown in the drawings, provide for a soft start mode for synchronous/standard buck power converters with wide input voltage ranges, e.g. where the input voltage ranges from 90 VDC to 600 VDC. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of DC-DC power conversion comprising:
    converting a DC link voltage to a DC output voltage for a load that is lower than the DC link voltage using a buck converter;
    outputting a first control signal based on the DC output voltage and a commanded output voltage using a voltage regulation logic component;
    outputting a second control signal based on the DC output voltage using a soft start function logic component;
    controlling the buck converter in a normal switching mode in response to the DC link voltage being below a predetermined high threshold, wherein controlling the buck converter in the normal switching mode comprises:
    switching the first control signal from the voltage regulation logic component to a current control logic component using a switch logic component; and
    controlling a switching frequency of the buck converter using the current control logic component responsive to the first control signal; and
controlling the buck converter in a soft start switching mode in response to the DC link voltage being at or above the predetermined high threshold, wherein controlling the buck converter in the soft start switching mode comprises:
    switching the second control signal from the soft start function logic component to the current control logic component using the switch logic component; and
    controlling the switching frequency of the buck converter using the current control logic component responsive to the second control signal.

2. The method as recited in claim 1, wherein controlling the buck converter in the soft start switching mode includes latching the soft start switching mode in an enabled state upon occurrence of:
    enablement of voltage regulation in the buck converter;
    the DC link voltage being at or above the predetermined high threshold, to keep a rate limited switching mode enabled even if the DC link voltage drops below the predetermined high threshold after latching; and
    the DC output voltage being at or below a predetermined initial soft start voltage limit.

3. The method as recited in claim 2, wherein controlling the buck converter in the soft start switching mode includes latching the soft start switching mode in the enabled state upon occurrence of:
    the DC output voltage not being at or above a predetermined final soft start voltage; and
    load current not being at or above a predetermined soft start current limit.

4. The method as recited in claim 3, further comprising: resetting the enabled state of the soft start switching mode upon disabling of voltage regulation in the buck converter.

5. The method as recited in claim 1, wherein controlling the buck converter in the normal switching mode includes controlling current to the load based on:
    measured current supplied to the buck converter at the DC link voltage, and
    a commanded inductor current for controlling current in a main inductor of the buck converter.

6. The method as recited in claim 5, wherein the commanded inductor current for controlling the current in the main inductor is derived from a voltage regulation control signal that is based on a differential of commanded output voltage and measured output voltage to the load.

7. The method as recited in claim 1, wherein controlling the buck converter in the soft start switching mode includes controlling current to the load based on:
    measured current supplied to the load,
    measured current supplied to the buck converter at the DC link voltage, and
    a commanded peak inductor ramp command for controlling current in a main inductor of the buck converter.

8. The method as recited in claim 7, wherein the soft start switching mode includes reducing a switching frequency in one switch of the buck converter and disabling a second switch of the buck converter.

9. A DC-DC conversion system comprising:
    a buck converter configured to receive a DC link voltage as input and to output a DC output voltage that is lower than the DC link voltage; and
    a controller operatively connected to the buck converter and configured to control the buck converter, wherein the controller comprises:
        a voltage regulation logic component configured to output a first control signal based on the DC output voltage and a commanded output voltage;
        a soft start function logic component configured to output a second control signal based on the DC output voltage;
        a current control logic component configured to control a switching frequency of the buck converter; and
        a switch logic component configured to receive input from the soft start function logic component and from the voltage regulation logic component, wherein the switch logic component is configured to switch between sending output from (i) the soft start function logic component to control the buck converter in a soft start switching mode in response to the DC link voltage being at or above a predetermined high threshold or (ii) the voltage regulation logic component to the current control logic component to control the buck converter in a normal switching mode in response to the DC link voltage being below the predetermined high threshold;
    wherein the soft start function logic component is configured to control the switch logic component to switch between the soft start switching mode and the normal switching mode; and
    wherein the soft start function logic component includes a rate limiter configured to output a rate limiting signal to the current control logic component.

10. The system as recited in claim 9, wherein the buck converter includes a positive DC link voltage node and a negative DC link voltage node, with a switching component connecting the positive and negative DC link voltage nodes, wherein the controller is configured to control switching of the switching component.

11. The system as recited in claim 10, wherein the switching component includes a pair of switches connected in series, wherein the buck converter includes a main inductor connecting a node between the pair of switches to a positive DC output node.

12. The system as recited in claim 11, further comprising:
    a first reluctance comprising an inductor winding resistance of the main inductor;
    a second reluctance connected in series between the positive DC output node and the negative DC link voltage node, wherein the negative DC link voltage node is configured to serve as a negative DC output node; and
    an input capacitor connected between the positive and negative DC link voltage nodes in parallel with the switching component.

13. The system as recited in claim 12, further comprising:
    a first current sensor configured to provide an input indicative of current through the positive DC output node to the soft start function logic component of the controller; and
    a second current sensor configured to provide an input indicative of current through the positive DC link voltage node to the current control logic component of the controller.

14. The system as recited in claim 13, further comprising:
a first voltage sensor configured to provide an input indicative of voltage across the positive DC output node and the negative DC link voltage node to the controller; and
a second voltage sensor configured to provide an input indicative of voltage across the positive and negative DC link voltage nodes to the controller.

15. The system as recited in claim 9, further comprising:
a differential logic component configured to output a differential signal indicative of a difference between the DC output voltage and the commanded output voltage to the voltage regulation logic component, the voltage regulation logic component configured to output the first control signal based on the differential signal.

16. The method as recited in claim 1, wherein controlling the buck converter in the soft start switching mode further comprises providing a rate limiting signal to the current control logic component using a rate limiter.

17. A DC-DC conversion system comprising:
a buck converter configured to receive a DC link voltage as input and to output a DC output voltage that is lower than the DC link voltage; and
a controller configured to:
control the buck converter in a normal switching mode in response to the DC link voltage being below a predetermined high threshold; and
control the buck converter in a soft start switching mode in response to the DC link voltage being at or above the predetermined high threshold;
wherein, to control the buck converter in the normal switching mode, the controller is configured to:
provide a first control signal responsive to the DC link voltage being below the predetermined high threshold;
switch the first control signal from a voltage regulation mode to current control mode responsive to the DC link voltage being below the predetermined high threshold; and
control a switching frequency of the buck converter using the current control mode responsive to the first control signal; and
wherein, to control the buck converter in the soft start switching mode, the controller is configured to:
provide a second control signal responsive to the DC link voltage being at or above the predetermined high threshold;
switch the second control signal to the current control mode responsive to the DC link voltage being at or above the predetermined high threshold; and
control the switching frequency of the buck converter using the current control mode responsive to the second control signal.

18. The system as recited in claim 17, further comprising:
a rate limiter configured to output a rate limiting signal to control the switching frequency of the buck converter.

19. The system as recited in claim 17, wherein the controller comprises:
a voltage regulation logic component configured to output the first control signal based on the DC output voltage and a commanded output voltage; and
a soft start function logic component configured to output the second control signal based on the DC output voltage.

20. The system as recited in claim 17, wherein the controller is configured to control switching between the soft start switching mode and the normal switching mode.

\* \* \* \* \*